2,960,773

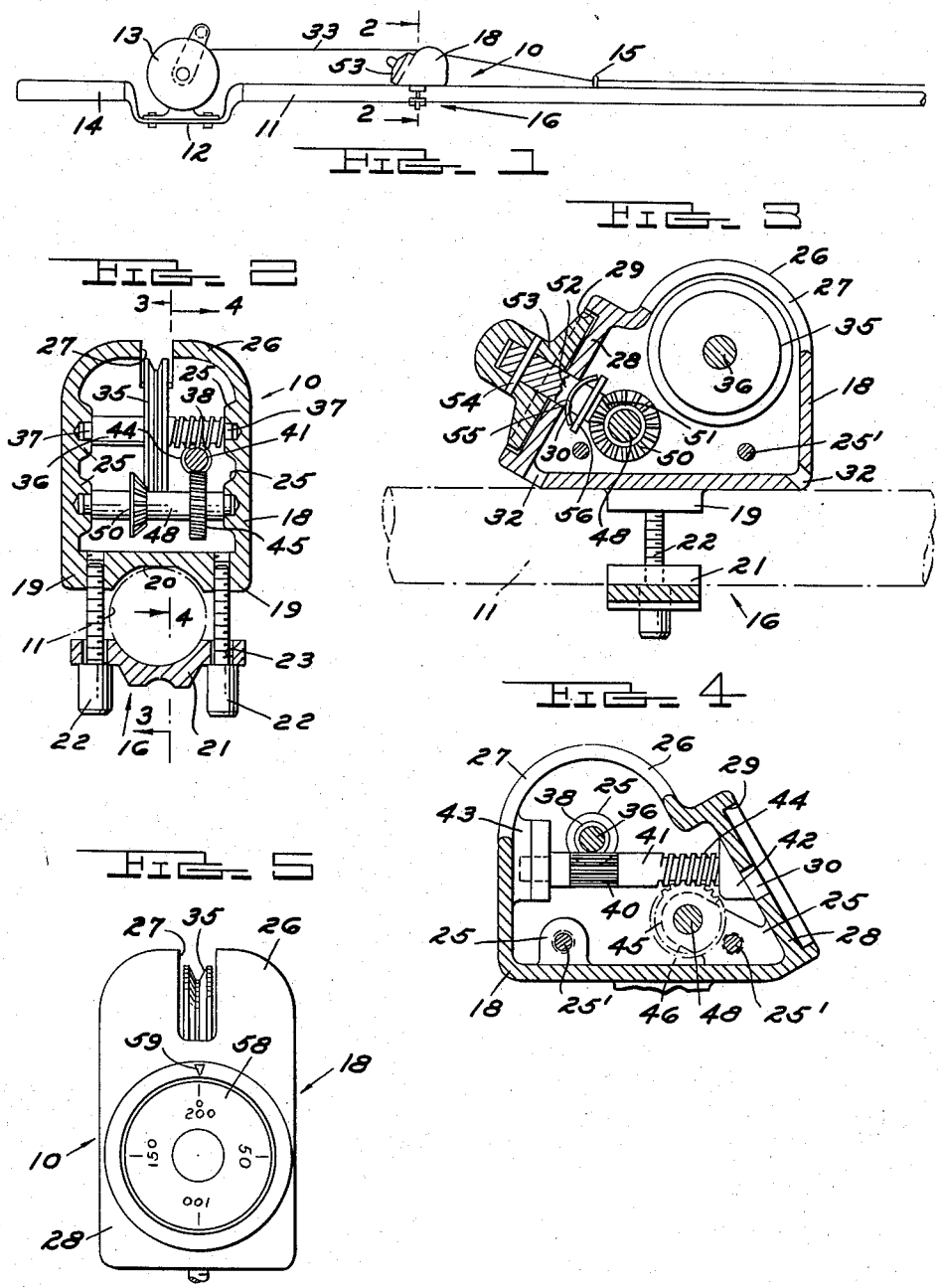
Nov. 22, 1960 — M. MOTT — 2,960,773
FISHING LINE DEPTH METER
Filed Sept. 29, 1958
INVENTOR.
MILTON MOTT
BY
ATTORNEYS , # United States Patent Office 2,960,773
Patented Nov. 22, 1960

FISHING LINE DEPTH METER

Milton Mott, 413 N. Hewitt, Ypsilanti, Mich.

Filed Sept. 29, 1958, Ser. No. 764,145

4 Claims. (Cl. 33—134)

The present invention relates to an improved meter device for attachment to a fishing rod for the purpose of automatically measuring and indicating the amount of line which has been stripped from the reel, as in trolling, and thus indicate to the fisherman the depth of his lure.

It is an object of the invention to provide a depth meter of this sort which, though of simple and comparatively inexpensive construction, is reliable in its indication, and with accuracy amply sufficient for the purpose.

Another object is to provide a fishing line depth meter which comprises, in a suitable well shielded and drained housing, an arrangement of a grooved line guide roller, over which the fishing line is trained in frictional driving engagement, and a train of worm and bevel type gearing connecting this guide roller with an exterior dial for a suitably geared down operation of the latter, the depth being read directly from the dial. Though well shielded in the housing, the guide roller is conveniently accessible for application and removal of the line relative thereto.

Another object is to provide a meter device as described which may, because of the character of its roller and gearing components, operate with a minimum of friction, whether the components of the device are produced in a relatively precisely fabricated fashion, with correspondingly precise bearing provisions for the rotative parts, or in a less expensive way by a procedure more adapted for mass production.

Still another object is to provide a meter device as described which incorporates a minimum of rotative parts, and in which such parts as are coaxial may be integrally formed in the most inexpensive way.

In further accordance with the invention, the meter device, although incorporating worm and bevel type gearing which is inherently self locking, may, nevertheless, be reversed in its rotation upon retrieve of the line by the same frictional rotation by the line as occasions its measuring and indicating operation.

A still further object is to provide a depth meter device of the character referred to, in which the operating parts are well and thoroughly encased in a very compact, light weight housing or casing removably applicable to a fishing rod. This housing has adequate drainage provision, so that the parts are exposed no more than absolutely necessary to a moist atmosphere. Moreover, the housing may be quickly applied to and removed from the rod, for use as needed, and occupies a minimum space in a tackle box.

The foregoing as well as other objects will become more apparent as this description proceeds, especially when considered in connection with the accompanying drawing illustrating the invention, wherein:

Fig. 1 is a fragmentary view in side elevation of a conventional fishing rod equipped with the improved depth meter device of the invention;

Fig. 2 is a view in enlarged scale of the device in section in a plane corresponding to that of the line 2—2 of Fig. 1;

Figs. 3 and 4 are views in section, respectively, along lines 3—3 and 4—4 of Fig. 2; and Fig. 5 is a face view of the device from the handle of the rod.

As illustrated in Fig. 1 of the drawing, the improved depth meter device 10 of the invention is removably applicable for use on a conventional type of fishing rod 11, shown as a bait casting rod having an offset reel seat 12, to which a conventional reel 13 is applied in the usual fashion, and a handle 14. Also typically, the rod 11 is provided with a series of line guide eyes 15 along its length.

The device 10 includes a clamp 16 by which it is attached to the rod 11, preferably between the reel seat 12 and the first line guide eye 15 adjacent the seat.

As shown in Figs. 2 through 5, the device 10 comprises a suitable housing or casing 18 which has side bosses 19 on either side of a clamp seat 20 on its bottom. A clamp head 21 coacts with the clamp formation 20 to hold the device on the rod, suitable screws 22 being inserted through spaced apertures 23 in the clamp head and threadedly received in the bosses 19. Housing 18 may be fabricated in any desired fashion, but the factors of expense, compactness and lightness in weight govern its construction. It may be molded of a suitable plastic, in a minimum number of parts necessary to enable its internal operating components to be assembled and held. Opposed internal and upright side walls of the housing are provided with inwardly projecting bosses 25 for the rotative reception and journalling of the components in question. Other bosses 25 may also be formed, at which suitable pillars or screws 25' are applied to hold the parts of the housing together. These details form no part of the invention.

The upper and forward portion of the housing is shaped in a convex arcuate outline at 26. It is provided in this arcuate portion with a relatively narrow line receiving slot 27 through the material. This slot, as illustrated in Fig. 3, is of but slightly less than 180° extent.

A rear inclined wall portion 28 of the housing 18 is provided with a circular recess 29, and this recess is centrally apertured at 30, for a purpose to be described. Drain openings 32 are also formed in the bottom of the housing, adjacent the front and rear thereof, for the disposal of any water dripping from the fishing line 33 (Fig. 1) as applied to the device 10.

As shown in Figs. 2 and 3, a fairly deeply grooved line guide roller 35 is disposed within the housing 18, in longitudinal alignment with the line receiving recess 27. This roller may be integrally formed on a shaft 36 having bearing portions 37 at its opposite ends which is rotatably received in two opposed wall bosses 25. As indicated above, the bearing provisions may be of any desired degree of accuracy and precision, as governed by the intended cost of production.

Shaft 36 also mounts, preferably as a portion integral with it and the line guide roller 35, a worm 38 of relatively short length.

Referring now to Figs. 2 and 4 of the drawing, the worm 38 is in meshing engagement with the worm wheel formation 40, which is preferably cut integral with a further, front-to-rear shaft or stem 41. This stem extends to one side of the guide roller 35, and is rotatably journalled at its opposite ends in bearing bosses 42, 43, respectively on an inclined rear housing wall 28 and on a forward wall longitudinally opposed thereto.

A second worm 44 is formed, preferably integral, on the shaft or stem 41; and this second worm is in rotative meshing engagement with a second worm wheel 45. For the mounting of the worm wheel 45 in desired relation to the meshing worm 44, the housing 18 is provided with a forwardly and upwardly inclined extension 46 of a pair of its boss formations 25, and the worm wheel 45 is journalled in these extensions on a shaft 48, on which the worm wheel may be integrally formed.

The same shaft 48 also has a bevel gear 50 thereon, likewise preferably integral, as illustrated in Fig. 2.

Bevel gear 50 meshes (see Fig. 3) with a bevel pinion 51 carried on an inclined drive stem 52 which is rotatably received in the central opening 30 in the inclined rear indicator wall 28 of the housing. An indicator dial 53, which is received within the circular recess 29 of this wall, is fixedly secured on the stem 52, as by a pin 54. Undesired axial end play of the stem 52 and dial 53 is avoided by a provision of an annular spring 55 surrounding the stem 52 and acting between the inner surface of wall 28 and an annular shoulder 56 on the stem. This holds the bevel gear 50 and pinion 51 in proper running engagement, and also maintains the dial in snug fit against the housing.

As shown in Fig. 5, the dial 53 is provided with appropriate calibrations 58 in terms of depth, and an indicator pointer 59 is provided for coaction with this dial.

In use, as in trolling, the line 33 is positioned in the housing slot 27 in frictional engagement in the groove of guide roller 35. As it is played out in reaching trolling depth, the frictional effort exerted on roller 35 causes its shaft 36 to rotate at relatively high speed, and the shaft worm 38 drives front to rear stem 41 (Fig. 4) at reduced speed. The worm 44 of shaft or stem 41 transmits rotation to the worm wheel 45 on shaft 48 at a further speed reduction; and the bevel gear 50 on the same shaft transmits this rotation to dial stem 52 and dial 53. The depth of the lure (not shown) is read off at any desired time from the calbirations of dial 53.

What I claim as my invention is:

1. A fishing line depth meter comprising a housing having means to attach the same to a fishing rod, a grooved line guide roller having means by which it is rotatably mounted on and within said housing and about an axis transverse that of the rod, said housing having an elongated, relatively narrow and upwardly facing aperture generally paralleling the axis of the rod through which a peripheral portion of said roller is upwardly and forwardly exposed for frictional driving engagement by said line, an indicator member rotatably mounted on said housing, and gearing drivingly connecting said roller with said indicator member to rotate the latter from the former at a reduced speed rate.

2. A fishing line depth meter comprising a housing having means to attach the same to a fishing rod, a grooved line guide roller having means by which it is rotatably mounted on and within said housing and about an axis transverse that of the rod, said housing having an elongated, relatively narrow and upwardly facing aperture generally paralleling the axis of the rod through which a peripheral portion of said roller is upwardly and forwardly exposed for frictional driving engagement by said line, an indicator member rotatably mounted on said housing, and worm gearing drivingly connecting said roller with said indicator member to rotate the latter from the former at a reduced speed rate, said gearing comprising a worm rotatable with said roller, a worm wheel mounted on a shaft journalled by said housing for meshing engagement with said worm, a further worm and worm wheel set journalled by said housing and driven by said shaft, and means driving said indicator member from said further set.

3. A fishing line depth meter comprising a housing having means to attach the same to a fishing rod, a grooved line guide roller having means by which it is rotatably mounted on and within said housing and about an axis transverse that of the rod, said housing having an elongated, relatively narrow and upwardly facing aperture generally paralleling the axis of the rod through which a peripheral portion of said roller is upwardly and forwardly exposed for frictional driving engagement by said line, an indicator member rotatably mounted on said housing, and worm gearing drivingly connecting said roller with said indicator member to rotate the latter from the former at a reduced speed rate, said gearing comprising a worm rotatable with said roller, a worm wheel mounted on a shaft journalled by said housing for meshing engagement with said worm, a further worm and worm wheel set journalled by said housing and driven by said shaft, a bevel gear rotatable with the worm wheel of said further set, and a bevel pinion rotatable with said indicator member and in driven mesh with said bevel gear.

4. A fishing line depth meter comprising a housing having means to attach the same to a fishing rod, a grooved line guide roller having means by which it is rotatably mounted on and within said housing and about an axis transverse that of the rod, said housing having an aperture through which said roller is exposed for frictional driving engagement by said line, an indicator dial rotatably mounted on said housing, said dial and housing having coacting indicia means, and gearing rotatably mounted within said housing and drivingly connecting said roller with said dial to rotate the latter from the former at a reduced speed rate, said gearing comprising a worm rotatable with said roller, a worm wheel in mesh with said worm, and a further worm and worm wheel set operatively connected to said dial and driven by the first named worm wheel.

References Cited in the file of this patent

UNITED STATES PATENTS

| 1,511,586 | Waltermire | Oct. 14, 1924 |
| 2,576,629 | Morby | Nov. 27, 1951 |
| 2,742,703 | Riede | Apr. 24, 1956 |
| 2,762,129 | Morgan | Sept. 11, 1956 |